United States Patent [19]
Badger

[11] 3,904,441
[45] Sept. 9, 1975

[54] BATTERY VENT CONSTRUCTION

[75] Inventor: John P. Badger, Genoa, Ohio

[73] Assignee: Eltra Corporation, Toledo, Ohio

[22] Filed: Dec. 26, 1973

[21] Appl. No.: 431,139

[52] U.S. Cl. ................. 136/177; 136/178; 136/179
[51] Int. Cl. ............................................ H01m 1/06
[58] Field of Search ............ 136/177, 178, 179, 133

[56] References Cited
UNITED STATES PATENTS

| | | | |
|---|---|---|---|
| 2,872,499 | 2/1959 | Rowls et al. | 136/177 |
| 3,096,216 | 7/1963 | Warren | 136/178 X |
| 3,282,740 | 11/1966 | Wylie | 136/177 X |
| 3,329,531 | 7/1967 | Hennen | 136/177 |
| 3,466,199 | 9/1969 | Hennen | 136/177 |
| 3,560,266 | 2/1971 | Mossford | 136/177 |
| 3,615,868 | 10/1971 | Melone | 136/178 |

Primary Examiner—Winston A. Douglas
Assistant Examiner—John F. Niebling
Attorney, Agent, or Firm—Owen & Owen Co.

[57] ABSTRACT

A novel venting system for a service free storage battery which allows escape of generated gases but not of battery liquid. The system includes a strip of microporous, hydrophobic filter media extending across vent apertures in the battery cover and a rigid guard over said filter strip which permits gas to escape through passages between the guard and cover and which protects the filter strip from external damage.

3 Claims, 5 Drawing Figures

PATENTED SEP 9 1975　　　　　　　　　　3,904,441
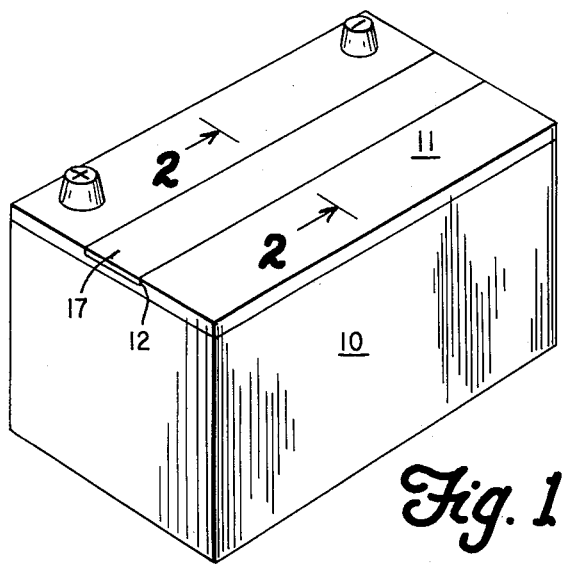
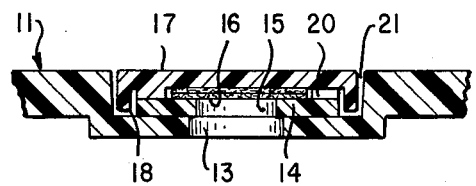
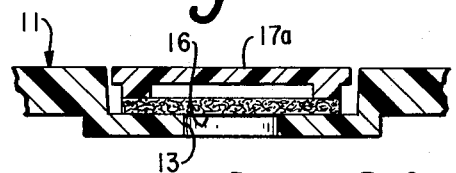
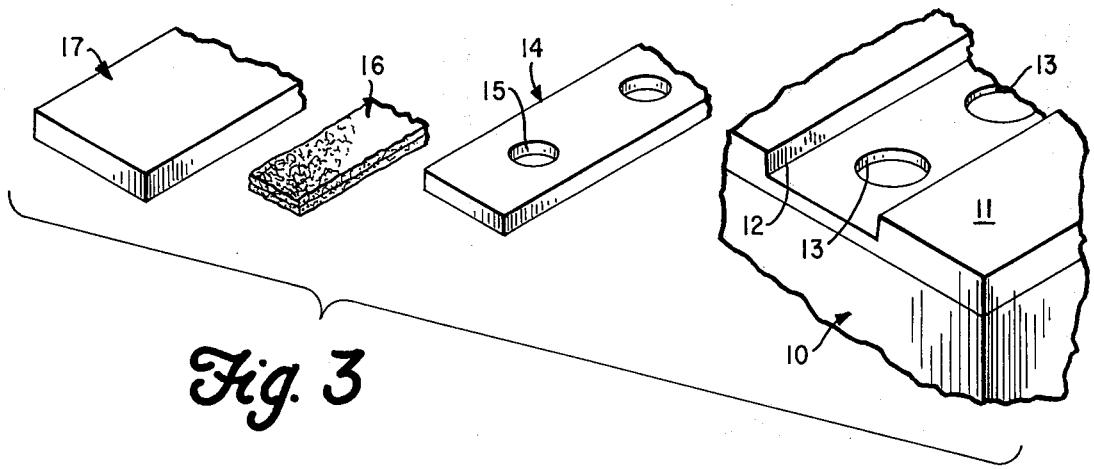
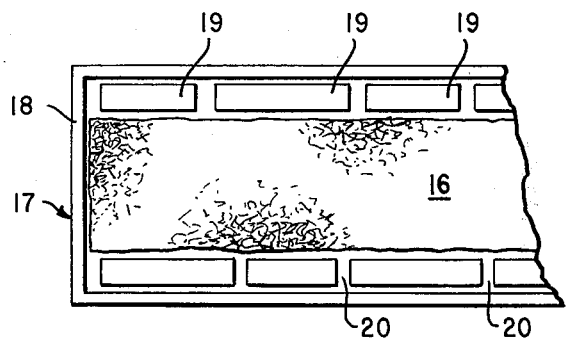

BATTERY VENT CONSTRUCTION

This invention relates to a battery vent construction particularly for use in automotive type storage batteries where consumer demands for service free batteries are becoming more exacting while at the same time, operating conditions over large temperature variations are increasing the difficulty in providing good battery design.

Conventional batteries of the automotive type have been vented through a cap in each of filler plugs for the various battery cells, or through a ganged cap for two or more cells. The caps themselves usually provide a mechanical barrier against the splashing of liquid from the inside of the battery but yet will permit the egress of gases generated in the battery. An example of this latter type construction is shown in commonly owned U.S. Pat. No. 3,540,939.

More recently, microporous filter materials of controlled porosity have been developed which are capable of being substantially or completely liquid impervious but will pass gas at a rate dependent upon the controlled porosity of the filter material. Such materials, several of which are disclosed in U.S. Pat. No. 3,033,911 commonly are of a microporous polypropylene material which is hydrophobic in nature and therefore resists being wetted by liquid and will retain its capacity to being gas permeable even though occasionally splashed by liquid from the battery cell. The above U.S. Pat. No. 3,033,911 discloses the use of tubular filters of such materials in individual vent plugs while U.S. Pat. No. 3,360,403 suggests the use of an exposed strip of such material as a common liquid barrier across a series of ganged or side by side battery vents.

Constructions such as suggested by the last two aforementioned patents have certain disadvantages in use in that the necessarily fragile filter material is exposed to mechanical damage and contamination by grease or other liquids which are commonly present in the environment of an automotive engine compartment. In addition, the use of relatively large areas of such materials, which may be necessary to obtain the total gas flow rate necessary for a commercial battery under severe over-charging, presents mechanical problems in that the materials are not self withstanding in large sheets and may be broken or severely sagged, thus destroying any filtering capacity and allowing the evaporation or splash-out of liquids.

Accordingly, an object of this invention is to provide a battery vent construction in which a microporous filter media, such as hydrophobic polypropylene, is used in conjunction with other elements incorporated on a battery cover to provide a service free battery vent which will withstand normal shocks and which is not subject to external contamination from grease, oil, etc.

It is another object of this invention to provide a battery vent which accomplishes the foregoing objects and which can be economically formed within the cover for an automotive type storage battery to present a pleasing appearance without external obstructions upon the cover, as is the case with the gang type vents or individual vent plugs as mentioned above.

Other objects and advantages of this invention will be apparent from the following detailed description of preferred embodiments thereof, with reference being made to the accompanying drawings in which:

FIG. 1 is a schematic view in perspective of a storage battery including the improved battery vent system of this invention;

FIG. 2 is a cross sectional view, taken along line 2—2 of FIG. 1 and shown on an enlarged scale, illustrating the details of construction of one embodiment of the battery vent system of this invention;

FIG. 2A is another cross sectional view, similar to FIG. 2, and showing the details of construction of another embodiment of the invention;

FIG. 3 is an expanded or blown up view of elements of the battery vent system of this invention, shown in the order of assembly on the battery cover; and FIG. 4 is a view in elevation of a portion of the lower surface of assembled parts of the FIG. 2A embodiment of the battery vent system of this invention.

Referring first to FIG. 1, a typical storage battery 10 is shown, having a one piece molded cover 11 adhesively sealed or otherwise joined to the battery box. The cover 11 has a longitudinal channel 12, as best seen in FIG. 3, extending across its length with a plurality of spaced apart apertures 13 which each lead to a battery cell as will be readily understood by a person who is skilled in the art. As seen in FIG. 1, the intercell electrical connections are internal so that the cover of the battery 10 presents a simplified and pleasing appearance and is characterized by the absence of protrusions other than the positive and negative terminals as illustrated.

FIG. 2 shows a cross section of the cover 11 and illustrates the manner in which the elements of the vent system of one embodiment of this invention are positioned within the channel 12. An elongate acid proof gasket 14 having a plurality of openings 15 positioned to coincide with the apertures 13 in the cover 11 is provided to be adhesively sealed across the middle of the channel 12 upon the upper surface of the cover 11. The gasket 14 must be acid resistant and impermeable to both liquid and gas. A gasket of a closed cell, foamed neoprene rubber or other equivalent material has been found to be satisfactory.

Extending across the upper surface of the gasket 14 is a strip of the microporous filter material 16 which is of less width than the gasket 14 and which has its upper surface, as shown in FIG. 2, adhesively secured to the lower planar surface of a rigid elongate guard 17 which extends across the length of the battery cover 11 within the channel 12. As best seen in FIGS. 2 and 4, the guard 17 has a generally planar upper surface with a continuous rim extending around its periphery to provide a continuous downwardly extending lip 18 on both ends and the sides of the guard 17 and a plurality of spaced apart platforms or spacers 19 lying outside of the filter strip 16 but within the peripheral lip 18. As seen in FIG. 2, the lower surface of the platforms or spacers 19 is adhesively secured to the adjacent upper surface of the gasket 14 to hold the guard 17 in place upon the cover 11. The filter strip 16 is slightly compressed between the adjacent surfaces of the gasket 14 and undersurface of the guard 17 so that a liquid barrier is presented by the combination of the cover 11, gasket 14, and filter strip 16. Spaces or passages 20 between the platforms 19 on the guard 17 provide a passage for gas which has passed upwardly through the aperture 13 and opening 14 and thence laterally through the filter strip 16.

As seen in FIG. 2, the gas passage 20 is in communication with a space 21 between the lip 18 on the guard 17 and the opposed side of the channel 12 in the cover 1. It will be noted that the lower end of the lip 18 is spaced from the bottom of the channel 12 due to the total thickness of the gasket 14 and platform 19 which is slightly more than the length of the downwardly depending lip 18. The lip 18 thus provides a physical barrier against the ingress of dirt, oil, etc., into the position of the filter strip 16 and also forms an egress passage for gas passing through the filter 16.

In a second embodiment, as illustrated in FIG. 2A, the filter strip 16 itself may be adhered directly to the adjacent base of the cover 11 and lower surface of the guard 17a which effectively eliminates the gasket 14. In this construction, the guard 17a has the same series of spaced apart platforms 19 and interjacent passages but has no lip 18. The filter strip 16 itself may be slightly compressed to better seat the adhesive in the areas where it is sealed to the cover 11 and platform 19. In either embodiment, the relatively fragile filter strip 16 is protected from external mechanical damage and also impregnation by oil or other dirt by the guard 17. The guard 17 also adds a pleasing appearance to the battery and can be made in a matching or contrasting color as desired.

As previously pointed out, microporous polypropylene of suitable porosity has been found to be most satisfactory as material comprising the filter strip 16. Because automotive batteries are commonly subjected to high rate chargers in the field at service stations, and controls to prevent overcharging are usually non-existant, the filter strip must have sufficient surface area to be able to pass the substantial amount of gas generated under such high charging conditions. For example, a lead-acid battery at 25°C and at atmospheric pressure, will evolve gas at the rate of about 312 cubic centimeters per cell per minute, when overcharged at 30 amperes. Thus, the system of the embodiments described above must be capable of passing this amount of gas, preferably with no more than one half psi pressure differential across the vent. It has been determined that non-woven polypropylene filter material with an effective average pore diameter of 4.5 to 5.0 microns, a thickness of 0.050 inches or less and a total porosity of 60% or more is capable of this capacity when the total exposed filter area is 0.44 square inches per cell. At the same time, the filter material retains its ability to prevent the passage of liquid through this area which is the equivalent of an aperture 13 in each of the battery cells, each aperture 13 having a diameter of 0.75 inches, so that the total filter area for six cells would be about 2.65 square inches. In addition, the hydrophobic nature of this material will also prevent the material from being flooded by splashed liquid which could deleteriously block off its gas filtering capacity.

For certain types of batteries where field service conditions can be more closely controlled so that severe overcharging is not as great a problem, other more dense vent materials may be satisfactory. For example, microporous polypropylene film currently supplied in several grades by Celanese Plastics Co. under the trademark "Celguard" can be used. Since a battery will evolve about 10.4 cubic centimeters of gas per minute per cell per ampere when overcharged, the filter must have the capability of passing the predicted rate of gas generation at an acceptable pressure differential of, for example ½ psi. This capability to vent the evolved gas is, of course, dependent upon the total effective area of the filter as well as the porosity, effective pore diameter and thickness of the material. Accordingly, where other design limitations will permit a larger filter area, more dense materials may be used. However, unless overcharging can be absolutely controlled, an effective filter capacity safety factor should be incorporated to prevent a pressure build-up within a battery when the gas generation rate exceeds the filter capacity. For example, if internal pressure exceeds 1 psi, end wall bulging can become noticeable in certain sizes of automotive batteries. If much larger pressures are generated, damage to the filters themselves or even the battery case can take place.

The venting system of this invention is effective in reducing unwanted evaporation, particularly where the battery is subjected to elevated temperatures as would be the case in an automobile engine compartment during summer operation. For example, a laboratory test with an automotive battery at 71° C (150°F) under standard ambient pressure showed an evaporation loss rate of 0.225 cc/hour without the guard in place and a rate of 0.069 cc/hour with the guard in place.

The venting system of this invention effectively provides a non-spill, maintenance free battery free of the defects which have characterized prior art attempts to provide the same. Some of the more complex attempts to provide a gel-encapsulated electrolyte, absorptive separators or mechanical barriers against acid leakage and/or evaporation suffer from the fact that these approaches increase greatly the manufacturing cost and may result in a reduction in battery capacity for a given external volume. The present system is simple and inexpensive and does not affect battery capacity by attempting to somehow immobilize the electrolyte.

Other objects and advantages of this invention will be apparent to those skilled in the art and various modifications may be made to the above described preferred embodiments without departing from the scope and spirit of the following claims.

What I claim is:

1. A venting system for a storage battery comprising, in combination, a generally planar battery cover having an elongate channel extending across said cover and recessed below the plane of said cover, a plurality of apertures extending through the floor of said channel for communication with the cells of said battery, an elongate flat strip of microporous material substantially coextensive with and extending over and sealed to the floor of said channel to cover said apertures, said microporous strip comprised of a material permeable to gas but substantially impermeable to liquid, and an elongate rigid guard extending over the outer face of said microporous strip and being substantially coextensive with said strip, said guard having spaced apart peripheral portions of its lower surface sealed to said strip such that gas passing outwardly through said apertures and filter strip may pass to atmosphere through passages between said spaced apart peripheral portions of said strip.

2. The venting system of claim 1 wherein the upper surface of said rigid guard is substantially coplanar with the upper surface of said battery cover.

3. The venting system of claim 1 wherein the lateral edges of said elongate rigid guard are slightly spaced from the opposed sidewalls of said elongate channel to provide a gas passage therebetween.

* * * * *